Figure 1:
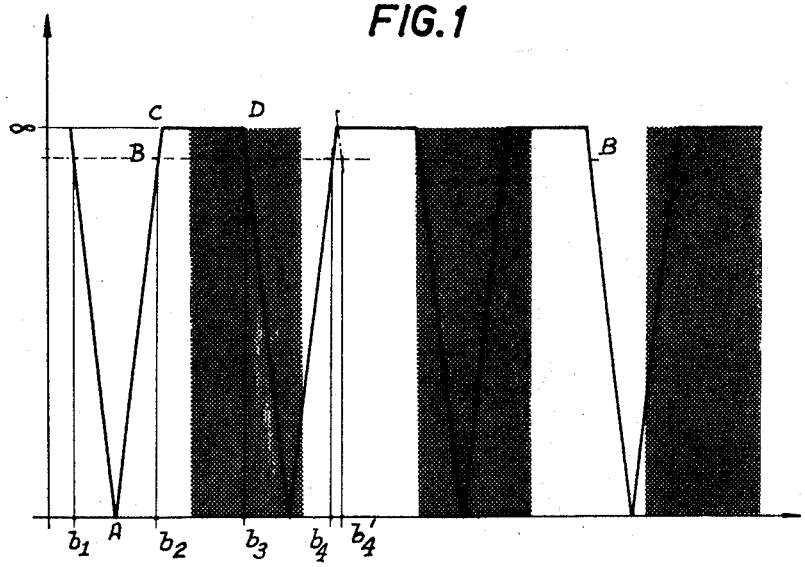

May 25, 1965     T. PATHE     3,186,002
METHOD OF OBTAINING CINEMATOGRAPHIC
PICTURE, AND APPARATUS THEREFOR
Filed March 9, 1962     2 Sheets-Sheet 1

United States Patent Office 3,186,002
Patented May 25, 1965

3,186,002
METHOD OF OBTAINING CINEMATOGRAPHIC PICTURE, AND APPARATUS THEREFOR
Theophile Pathe, 20 Rue du Ranelagh, Paris, France
Filed Mar. 9, 1962, Ser. No. 178,765
Claims priority, application France, Mar. 10, 1961,
855,159, Patent 1,291,017
5 Claims. (Cl. 352—86)

Numerous attempts have been made to photograph and project cinematographic pictures in such a manner as to create an impression of reality. To this end, some methods aim at obtaining stereoscopic relief and require spectators to wear special spectacles during projection, but this constitutes a serious disadvantage and hinders the commercial development of these methods. Other methods provide a broadened field of vision corresponding to that of human vision, but this does not per se create an impression of reality.

It has also been suggested that the lens focussing be varied, when filming, between the two extreme points of the depth of field of the lens, this variation being effected in a regular and continuous manner, whereby close-up and distant views are alternately sharp and, by this means, a certain illusion of reality is created as a result of the depth of field of sharp focus of the picture as seen by the viewer. However, it has never been possible to use this method in practice due to the lack of sharpness at certain depths in the picture.

The present invention has for an object a method for obtaining cinematographic pictures which creates a good illusion of reality upon projection.

According to the invention, there is provided a method of obtaining cinematographic pictures creating an illusion of reality upon projection, wherein the focus setting is varied during filming, said variation being effected irregularly so that the focus setting for distant views lasts for a period approximately as long as that of the focus setting for close-ups.

The invention also provides a cinematographic camera for carrying out this method, comprising means for relatively displacing the camera lens or an element thereof and the film in an irregular manner, so that the distant views are in focus for a period approximately equal to that for which close-ups are in focus.

Actually, the variation of lens focus setting for close-ups (for example 0.50 to 5 metres) requires a lens displacement which is relatively much greater than that required to vary the focus setting for distant views (for example from 5 metres to infinity). Consequently, if the lens is regularly and continuously displaced, the focus setting for close-ups lasts very much longer than that for the distant views; the sharpness of the close-ups predominates, thereby detracting from the illusion of reality. The present invention effectively re-establishes the balance, so that there is apparent sharpness for all distances in the picture upon projection.

The irregular variation in focus may be obtained by limiting the variation when the distant views are in focus and by accelerating this variation when close-ups are in focus, but it is preferably effected by briefly dwelling on the focus setting for distant views, for example at infinity.

In order to vary the focus, it is possible either to displace the lens or an element thereof, the film being fixed, or, alternatively, to displace the film, the lens being fixed.

The lens may, for example, be movable along its optical axis and be connected to a motor by means of a mechanical transmission so that this motor may cause it to have an alternating movement. As a modification, the film focal plane may be movable by moving the guide in which the film runs, by connecting it to a motor capable of causing it to have an alternating movement in the direction of the optical axis of the lens, the latter being fixed. In both cases, the motor may be independent or may be the normal camera motor.

Alternatively, the lens may have a soft iron member associated therewith surrounded by a winding connected to a pulsed or alternating current source.

Figure 4:
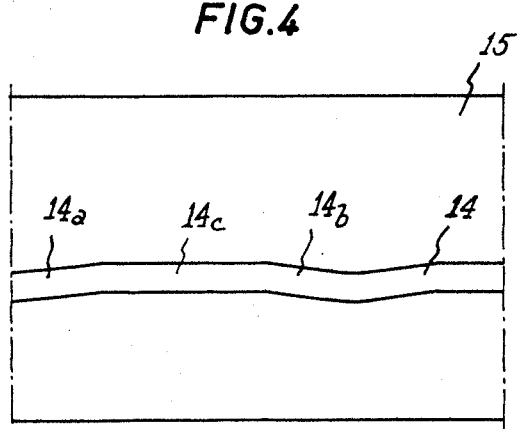
Figure 2:
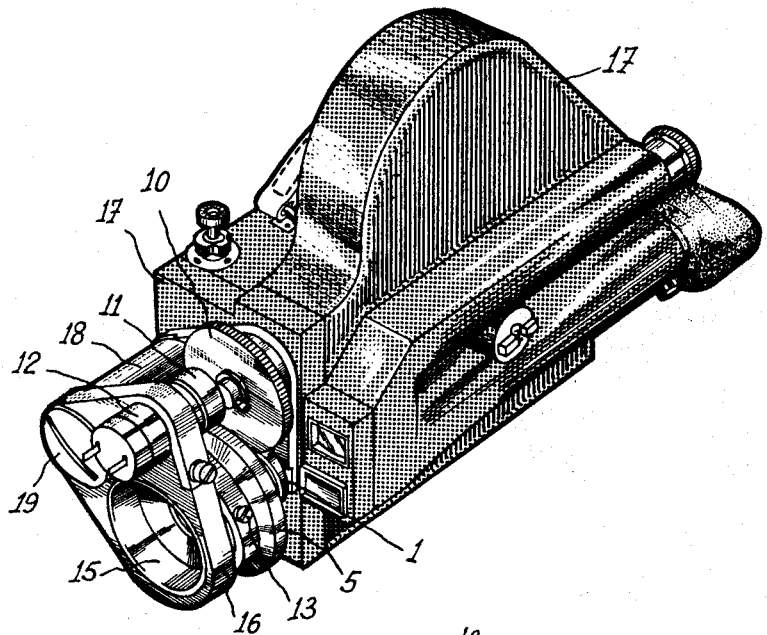
Figure 3:
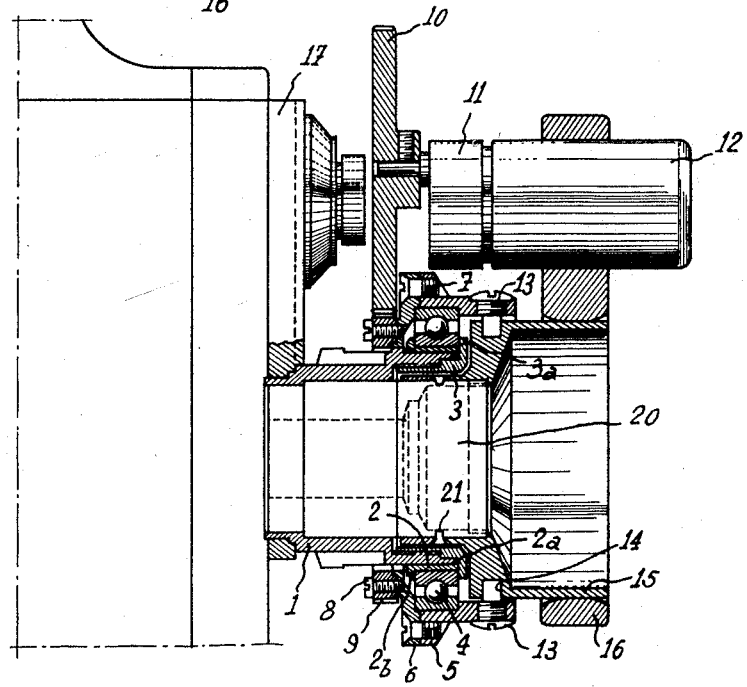

In order that the invention shall be more clearly understood, reference will now be made to the accompanying drawings which show one embodiment of a camera according thereto by way of example, and in which:

FIGURE 1 shows a curve demonstrating the displacement of the lens as a function of time, FIGURE 2 shows a perspective view of a cinematographic camera for carrying out the method according to the invention, FIGURE 3 shows a section along a plane passing through the optical axis of the lens of the camera of FIGURE 2, and FIGURE 4 shows a developed portion of the ring onto which said lens is fixed.

In accordance with the invention, the lens focus is irregularly varied during filming, for example by briefly dwelling at the infinity position.

The frequency of oscillation of the lens focus should, in practice, be greater than the number of frames per second passing through the film gate and it varies according to the focal length of the lens; the magnitude of the frequency of oscillation is easily determined by experiment so that the viewer is not aware of the variation in focus. The dwell time, which varies with the lens aperture, may also be determined so as to balance the sharpness of the different views.

By way of example, FIGURE 1 shows the variation of lens displacement as a function of time, in the case of filming at a rate of 24 frames per second, the focal length being 20 mm. and the aperture being 2.8. The frequency of oscillation of the lens focus is 36.

Points A, B and C correspond to the respective focussing distances of 0.50 metres, 5 metres and infinity. It may be seen that if the movement were regular, the focus hold for close-ups (nearer than 5 metres) would last considerably longer than that for distant views; it may in fact be noted that period $b_1 b_2$ is much greater than period $b_4 b'_4$. The dwell period CD enables the balance to be re-established, period $b_1 b_2$ being of approximately the same duration as period $b_2 b_3$; it may, for example, last for 6/7ths of the time taken by the lens to effect a forward and return movement.

The cinematographic camera illustrated in FIGURES 2 and 3 is of a conventional type having a spring motor, and may be wound-up by a lever, not illustrated in the drawing.

A centering ring 2 is mounted on the lens mount 1, said ring resting on the front edge of the lens mount by means of a flange 2a and being held in position by a clamping ring 3 screwed into the lens mount. A bearing 4 is arranged on the ring 2, the inner race of the bearing being tightly held between flanges 2b and 3a of rings 2 and 3.

The outer race of bearing 4 is tightly held between a push member carrier 5 and a cover 6, these two members being fixed together by means of screws 7. A pinion 9 is fixed to the cover 6 by screws 8, said pinion 9 engaging with a pinion 10, keyed to the output shaft of a reducing gear 11, driven by an electric motor 12.

The push member carrier 5 is provided with studs 13 which engage in a groove 14 provided on the circumference of a ring 15. The latter is longitudinally slidably mounted on ring 3, on the one hand, and on a guide plate 16 on the other hand. This guide plate, which supports the motor 12 with its reducing gear 11, is fixed to the body 17 of the camera by a carrier 18 and a screw 19.

The lens 20 is fixed to the inside of the ring 15 by screws 21.

As may be seen from FIGURE 4, the shape of groove 14 comprises portions 14a for effecting retraction of the lens 20, portions 14b for effecting forward movement thereof and, between these, portions 14c which are located in planes perpendicular to the rotation axis of the ring and to which the dwell period of the lens movement corresponds.

When filming, the motor 12 is fed and operated in such a way that the ring 15 and its lens 20 are caused to have an alternating translatory movement, the path of which is shown as a function of the time by a curve such as that in FIGURE 1. The assembly is adjusted so that this path is equal to or less than the focal length of the lens, i.e. the lens is adjusted, for example, to infinity in its extreme retracted position, and, at its other extreme position, to a distance of 0.50 metres.

With the arrangement according to the invention, it is unnecessary either to wear special spectacles or to modify the projection apparatus.

When filming, a picture is obtained which appears sharp for all distances. Consequently, the operator may easily follow the movements of the actors in the foreground, the middle distance and the background, without changing focus. He may also simultaneously film several actions taking place at different distances.

Since the lens should preferably have a large aperture, the invention results in a considerable saving in lighting for the scenes to be filmed. Outdoors, it is possible to film in almost any kind of weather.

A relatively insensitive film may be used, e.g. a fine grain film. This advantage is especially important for the wide screen process in which the picture must be greatly enlarged.

It is clear that the invention is not limited to the embodiment described and illustrated, and that various modifications may be made to the specific details referred to.

Any picture format and filming system may be used and the invention is also applicable to television.

I claim:

1. In a process of cinematically photographing a three dimensional subject on a film strip which is periodically advanced to expose a predetermined number of frames per second, an improvement comprising: projecting an image of the subject on the film strip while varying, during at least a portion of the exposure time of each frame on the film strip, the focus of the image between conditions of focus at a distant plane in the view and focus at a close plane in the view, the focus being varied uniformly between said conditions of focus and being permitted to dwell at the condition of focus for the distant plane in the view.

2. In a process as claimed in claim 1 wherein the variation of the focus is cyclical and is at a rate greater than the number of frames per second.

3. In a process as claimed in claim 1 wherein the distant plane is at infinity and the focus of the image is prolonged for the condition of focus at infinity.

4. In a process as claimed in claim 3 wherein the focus is prolonged for the condition of focus at infinity for a time sufficient such that the time of projection of images corresponding to close-up view less than 5 meters is equal to the time for distant views greater than 5 meters.

5. A cinematographic camera having means for advancing a film strip and a lens for projecting an image on the film strip, the camera comprising means operatively associated with the lens and the film strip for producing relative movement therebetween, during at least a portion of the exposure period of each frame on the film strip, in a cyclical manner so as to vary the focus of the image projected on the film strip, said latter means including means for periodically and regularly interrupting the relative movement between the film strip and lens so as to provide a dwell period in the variation of the relative movement of the film strip and lens, said dwell period occurring at the extreme position corresponding to focus of the image for distant views to thereby compensate for the ordinary shorter time during which images are in focus for distant views.

References Cited by the Examiner
UNITED STATES PATENTS

| | | | |
|---|---|---|---|
| 1,927,925 | 9/33 | Dieterich | 352—86 |
| 2,207,419 | 7/40 | Smith | 88—1 |
| 2,258,903 | 10/41 | Mitchell | 352—140 |
| 2,387,546 | 10/45 | Walker | 352—140 |

JULIA E. COINER, *Primary Examiner.*